United States Patent
Suzuki et al.

(10) Patent No.: US 8,811,471 B2
(45) Date of Patent: Aug. 19, 2014

(54) MOVING PICTURE DECODING METHOD, MOVING PICTURE DECODING PROGRAM, MOVING PICTURE DECODING APPARATUS, MOVING PICTURE ENCODING METHOD, MOVING PICTURE ENCODING PROGRAM, AND MOVING PICTURE ENCODING APPARATUS

(75) Inventors: Yoshinori Suzuki, Saitama (JP); Choong Seng Boon, Yokohama (JP); Tsutomu Horikoshi, Kamakura (JP)

(73) Assignee: NTT DoCoMo, Inc., Tokyo (JP)

(*) Notice: Subject to any disclaimer, the term of this patent is extended or adjusted under 35 U.S.C. 154(b) by 1325 days.

(21) Appl. No.: 11/178,417

(22) Filed: Jul. 12, 2005

(65) Prior Publication Data
US 2006/0013297 A1    Jan. 19, 2006

(30) Foreign Application Priority Data

Jul. 14, 2004 (JP) .............................. P2004-207790
Jul. 23, 2004 (JP) .............................. P2004-216384

(51) Int. Cl.
*H04N 13/02* (2006.01)

(52) U.S. Cl.
USPC .................... 375/240.01; 375/240.28; 348/42

(58) Field of Classification Search
USPC ......... 348/42–44, 51–60; 375/240.01, 240.28
See application file for complete search history.

(56) References Cited

U.S. PATENT DOCUMENTS

| | | | | |
|---|---|---|---|---|
| 4,851,901 A | * | 7/1989 | Iwasaki | 348/42 |
| 5,684,529 A | | 11/1997 | Yoshimi et al. | |
| 6,040,852 A | * | 3/2000 | Stuettler | 348/43 |
| 6,055,012 A | * | 4/2000 | Haskell et al. | 348/48 |
| 6,061,083 A | * | 5/2000 | Aritake et al. | 348/51 |
| 6,088,006 A | * | 7/2000 | Tabata | 345/7 |
| 2003/0053797 A1 | | 3/2003 | Oshima et al. | |
| 2003/0108341 A1 | * | 6/2003 | Oshima et al. | 386/125 |
| 2004/0066846 A1 | | 4/2004 | Yun et al. | |
| 2004/0120396 A1 | | 6/2004 | Yun et al. | |

FOREIGN PATENT DOCUMENTS

| | | |
|---|---|---|
| JP | 10-243419 | 9/1998 |
| JP | 2000-092519 | 3/2000 |
| JP | 2003-111101 | 4/2003 |
| JP | 2004-040455 | 2/2004 |

OTHER PUBLICATIONS

Chinese Office Action in Corresponding Application No. 200510081974.8, dated Feb. 6, 2009, with English translation.
Text of ISO/IEC 14496-10: 2003/FPDAM1 (AVC Professional Extensions), Mar. 2004.

(Continued)

*Primary Examiner* — Sath V Perungavoor
*Assistant Examiner* — Jeffery Williams
(74) *Attorney, Agent, or Firm* — Brinks Gilson & Lione

(57) ABSTRACT

A moving picture decoding method of an embodiment according to the present invention is a moving picture decoding method for decoding encoded data of an interlaced scanned picture including Top field and Bottom field, and the method includes a stereo information acquisition step for acquiring stereo information indicating whether Top field and Bottom field are two pictures forming a stereo picture from the encoded data, a decoding step for decoding two fields corresponding to each other from the encoded data and generating two decoded fields, and an output step for outputting the two decoded fields. In the output step, the stereo information is referred to and the two decoded fields are outputted simultaneously.

9 Claims, 10 Drawing Sheets

(56) References Cited

OTHER PUBLICATIONS

Extended Search Report issued Jun. 17, 2009 in the counterpart EPO application, 10 pages.
Japanese Office Action mailed May 16, 2006.
Office Action from co-pending U.S. Appl. No. 13/242,351, dated Sep. 12, 2012, 10 pages.
Office Action from co-pending U.S. Appl. No. 13/242,351, dated Feb. 13, 2013, 12 pages.
Extended European Search Report for European Application No. 05015229.7, dated Jun. 17, 2009, 10 pages.
Examination Report for European Application No. 05015229.7, dated Nov. 3, 2011, 7 pages.
Extended European Search Report for European Application No. 12159229.9, dated Jun. 15, 2012, 7 pages.
Communication in corresponding European Application No. 05015229.7, dated Mar. 13, 2014, 13 pages.

\* cited by examiner

MOVING PICTURE DECODING METHOD, MOVING PICTURE DECODING PROGRAM, MOVING PICTURE DECODING APPARATUS, MOVING PICTURE ENCODING METHOD, MOVING PICTURE ENCODING PROGRAM, AND MOVING PICTURE ENCODING APPARATUS

BACKGROUND OF THE INVENTION

1. Field of the Invention

The invention relates to a moving picture decoding method, a moving picture decoding program, a moving picture decoding apparatus, a moving picture encoding method, a moving picture encoding program, and a moving picture encoding apparatus.

2. Related Background of the Invention

In the draft standard of the H.264 extension system, which is a moving picture encoding system, each of pictures provided for the left-view (left-view picture) and for the right-view (right-view picture) in a stereo picture can be encoded as either an odd line field or an even line field of an interlaced signal (an interlaced scanned picture). Further, a stereo video field message (stereo information) is specified as identification information indicating whether or not encoded moving picture data relates to a stereo picture. By referring to the data of the stereo video field message included in the encoded moving picture data, a decoder which decodes moving picture data can recognize whether each decoded field is a left-view or right-view picture of a stereo picture (for example, refer to Text of ISO/IEC 14496-10: 2003/FPDAM1 (AVC Professional Extensions), March 2004). Here, "a field" denotes a picture forming a moving picture, indicating a picture formed by odd scanning lines (odd line field), or a picture formed by even scanning lines (even line field) in a frame constituting a whole picture.

On the other hand, in the H.264 system, relative position among each output time of decoded picture (the term "picture" is a general term for a frame, a field, and a pair of two fields (hereinafter, referred to as a two-field pair)), which is a unit of decoding of a moving picture, is specified by information called Picture Order Count (POC), and the POCs of Top field and Bottom field are specified as Top POC and Bottom POC, respectively. When Top field and Bottom field are handled as components of a frame or a two-field pair (the same frame number is assigned to the two fields), a smaller value of Top POC and Bottom POC is specified as the POC. Therefore, the two fields have the same POC value. When Top field and Bottom field are handled as individually different fields (different frame numbers are assigned to the two fields), the POC values of the two fields are different. This information indicates relative position among each pictures in the temporal direction and is used, for example, in a prediction processing between pictures. Further, in the H.264 system, encoding of a time stamp of a decoded picture is specified. In a picture timing message including information of the above-mentioned time stamp in the H.264 system, it is possible to specify the number of time stamps to be encoded (one for a frame, one for a field, two for a two-field pair, etc.) using picture type information (picture_struct). In some cases, time information may be defined by system data integrating video data and audio data.

SUMMARY OF THE INVENTION

As described above, although a timing in which encoded moving picture data is decoded is specified by the above-mentioned standard, the decoding and output as a stereo video of encoded moving picture data including a stereo picture are not taken into account. Therefore, when a stereo video is decoded, there is a problem that left and right pictures are outputted at different time and it is not visible as a stereo picture.

The present invention has been made in order to solve the above-mentioned problem and an object is to provide a moving picture decoding method, a moving picture decoding program, a moving picture decoding apparatus, a moving picture encoding method, a moving picture encoding program, and a moving picture encoding apparatus capable of making it possible to simultaneously output the left and right pictures of an encoded stereo video.

In order to attain the above-mentioned object, the moving picture decoding method according to the present invention is a moving picture decoding method for decoding encoded data of an interlaced scanned picture, and the moving picture decoding method includes: a stereo information acquisition step for acquiring from the encoded data stereo information indicating whether or not pictures included in an interlaced scanned picture form a stereo picture; a decoding step for decoding a first picture and a second picture corresponding to each other as a stereo picture from the encoded data and generating a first decoded picture and a second decoded picture; and an output step for outputting the first decoded picture and the second decoded picture decoded in the decoding step, wherein in the output step, whether or not the first decoded picture and the second decoded picture form a stereo picture is judged by referring to the stereo information acquired in the stereo information acquisition step and if it is judged that they form a stereo picture, the first decoded picture and the second decoded picture are outputted, being made to correspond to each other as a stereo picture.

According to the above-mentioned moving picture decoding method, since the output of each picture can be executed simultaneously based on the acquired stereo information, it is possible to simultaneously output the left and right pictures of the encoded stereo video.

The moving picture decoding program is a moving picture decoding program for causing a computer to decode encoded data of an interlaced scanned picture, and the moving picture decoding program causes the computer to execute: stereo information acquisition processing for acquiring from the encoded data stereo information indicating whether or not the pictures included in an interlaced scanned picture form a stereo picture; decoding processing for decoding a first picture and a second picture corresponding to each other as a stereo picture from the encoded data and generating a first decoded picture and a second decoded picture; and output processing for outputting the first decoded picture and the second decoded picture decoded by the decoding processing, wherein in the output processing, whether or not the first decoded picture and the second decoded picture form a stereo picture is judged by referring to the stereo information acquired by the stereo information acquisition processing and if it is judged that they form a stereo picture, the first decoded picture and the second decoded picture are outputted, being made to correspond to each other as a stereo picture.

The moving picture decoding apparatus comprises: input means for inputting encoded data of an interlaced scanned picture; stereo information acquisition means for acquiring from the encoded data stereo information indicating whether or not the pictures included in an interlaced scanned picture form a stereo picture; decoding means for decoding a first picture and a second picture corresponding to each other as a stereo picture from the encoded data and generating a first decoded picture and a second decoded picture; and output means for outputting the first decoded picture and the second decoded picture decoded by the decoding means, wherein the output means judges whether or not the first decoded picture and the second decoded picture form a stereo picture by referring to the stereo information acquired by the stereo information acquisition means and if judging that they form an stereo image, outputs the first decoded picture and the second decoded picture, making them correspond to each other as a stereo picture.

The moving picture encoding method is a moving picture encoding method for generating encoded data by encoding an interlaced scanned picture, and the moving picture encoding method includes: a stereo information addition step for encoding stereo information indicating whether or not the pictures included in an interlaced scanned picture form a stereo picture and adding it to the encoded data; and an output information addition step for encoding output timing information holding information about the timing in which the picture is to be outputted as a stereo picture or output time information including information about the time at which the picture is to be outputted as a stereo picture and adding it to the encoded data.

The moving picture encoding program is a moving picture encoding program for causing a computer to generate encoded data by encoding an interlaced scanned picture, and the moving picture encoding program causes the computer to execute: a stereo information addition processing for encoding stereo information indicating whether or not the pictures included in an interlaced scanned picture form a stereo picture and adding it to the encoded data; and an output information addition processing for encoding output timing information holding information about the timing in which the picture is to be outputted as a stereo picture or output time information including information about the time at which the picture is to be outputted as a stereo picture and adding it to the encoded data.

The moving picture encoding apparatus is a moving picture encoding apparatus for generating encoded data by encoding an interlaced scanned picture, and the moving picture encoding apparatus comprises: stereo information addition means for encoding stereo information indicating whether or not the pictures included in an interlaced scanned picture form a stereo picture and adding it to the encoded data; and output information addition means for encoding output timing information holding information about the timing in which the picture is to be outputted as a stereo picture or output time information including information about the time at which the picture is to be outputted as a stereo picture and adding it to the encoded data.

In order to attain the above-mentioned object, the moving picture decoding method according to the present invention is a moving picture decoding method for decoding encoded data of an interlaced scanned picture including a first field and a second field, the moving picture decoding method includes: a stereo information acquisition step for acquiring stereo information indicating whether or not the first field and the second field are two pictures forming a stereo picture from the encoded data; a decoding step for decoding the first field and the second field corresponding to each other from the encoded data and generating a first decoded field and a second decoded field; and an output step for outputting the first decoded field and the second decoded field decoded in the decoding step, wherein in the output step, whether or not the first field and the second field form a stereo picture is judged by referring to the stereo information acquired in the stereo information acquisition step and if it is judged that they form a stereo picture, the first decoded field and the second decoded field are outputted simultaneously. The judgment in the output step includes a judgment as to whether or not a stereo picture is formed based on whether or not the stereo information is acquired in the acquisition of the stereo information in the stereo information acquisition step.

According to the above-mentioned moving picture decoding method, since the output of each field can be executed simultaneously based on the acquired stereo information, it is possible to simultaneously output the left and right pictures of an encoded stereo video.

The moving picture decoding program is a moving picture decoding program for causing a computer to decode the encoded data of an interlaced scanned picture formed by a first field and a second field, and the moving picture decoding program causes the computer to execute: stereo information acquisition processing for acquiring stereo information indicating whether or not the first field and the second field are two pictures forming a stereo picture from the encoded data; decoding processing for decoding the first field and the second field corresponding to each other from the encoded data and generating a first decoded field and a second decoded field; and output processing for outputting the first decoded field and the second decoded field decoded by the decoding processing, wherein the output processing judges whether or not the first field and the second field form a stereo picture by referring to the stereo information acquired by the stereo information acquisition processing and if judging that they form a stereo picture, outputs the first decoded field and the second decoded field simultaneously.

The moving picture decoding apparatus comprises: input means for inputting the encoded data of an interlaced scanned picture including a first field and a second field; stereo information acquisition means for acquiring stereo information indicating whether or not the first field and the second field are two pictures forming a stereo picture from the encoded data; decoding means for decoding the first field and the second field corresponding to each other from the encoded data and generating a first decoded field and a second decoded field, and output means for outputting the first decoded field and the second decoded field decoded by the decoding means, wherein the output means judges whether or not the first field and the second field form a stereo picture by referring to the stereo information acquired by the stereo information acquisition means and if judging that they form a stereo picture, outputs the first decoded field and the second decoded field simultaneously.

Preferably, in the output step, the first decoded field and the second decoded field are outputted at different times if the first field and the second field are judged not to form a stereo picture.

The moving picture encoding method is a moving picture encoding method for generating encoded data by encoding an interlaced scanned picture including a first field and a second field, and the moving picture encoding method includes: a stereo information addition step for encoding stereo information indicating whether or not the first field and the second field are two pictures forming a stereo picture and adding it to the encoded data; and an output timing information addition step for encoding output timing information including information about the timing in which the first field and the second field are to be outputted and adding it to the encoded data. "Adding it to the encoded data" also includes generating encoded data by multiplexing encoded fields etc. and the stereo information.

The moving picture encoding method is a moving picture encoding method for generating encoded data by encoding an interlaced scanned picture including a first field and a second field, and the moving picture encoding method includes: a stereo information addition step for encoding stereo information indicating whether or not the first field and the second field are two pictures forming a stereo picture and adding it to the encoded data; and an output time information addition step for encoding output time information about the time at which the first field and the second field are to be outputted simultaneously and adding it to the encoded data.

Preferably, the moving picture decoding method further includes an output timing information acquisition step for decoding and acquiring the output timing information including information about the timing in which the first field and the second field are to be outputted from the encoded data, and in the output step the first decoded field and the second decoded field are outputted based on the output timing information acquired in the output timing information acquisition step.

Preferably, the moving picture decoding method further includes an output time information acquisition step for decoding and acquiring the output time information about the time at which the first field and the second field are to be outputted simultaneously, and in the output step the first decoded field and the second decoded field are outputted based on the output time information acquired in the output time information acquisition step.

Preferably, the output timing information is information indicating that the time corresponding to information of the output time of either the first field or the second field is adopted as the output time, included in the encoded data.

Preferably, the output timing information is information indicating a magnitude relation between the numbers assigned to the first field and the second field for indicating the output order, included in the encoded data.

The moving picture encoding program is a moving picture encoding program for causing a computer to generate encoded data by encoding an interlaced scanned picture including a first field and a second field, and the moving picture encoding program causes the computer to execute: a stereo information addition processing for encoding stereo information indicating whether or not the first field and the second field are two pictures forming a stereo picture and adding it to the encoded data; and an output timing information addition processing for encoding output timing information including information about the timing in which the first field and the second field are to be outputted and adding it to the encoded data.

The moving picture encoding program is a moving picture encoding program for causing a computer to generate encoded data by encoding an interlaced scanned picture including a first field and a second field, and the moving picture encoding program causes the computer to execute: a stereo information addition processing for encoding stereo information indicating whether or not the first field and the second field are two pictures forming a stereo picture and adding it to the encoded data; and an output time information addition processing for encoding the output time information about the time at which the first field and the second field are to be outputted simultaneously and adding it to the encoded data.

The moving picture encoding apparatus is a moving picture encoding apparatus for generating encoded data by encoding an interlaced scanned picture including a first field and a second field, and the moving picture encoding apparatus comprises: stereo information addition means for encoding stereo information indicating whether or not the first field and the second field are two pictures forming a stereo picture and adding it to the encoded data; and output timing information addition means for encoding the output timing information including information about the timing in which the first field and the second field are to be outputted and adding it to the encoded data.

The moving picture encoding apparatus is a moving picture encoding apparatus for generating encoded data by encoding an interlaced scanned picture including a first field and a second field, and the moving picture encoding apparatus comprises: stereo information addition means for encoding the stereo information indicating whether or not the first field and the second field are two pictures forming a stereo picture and adding it to the encoded data; and output time information addition means for encoding the output time information about the time at which the first field and the second field are to be outputted simultaneously and adding it to the encoded data.

The moving picture decoding method is a moving picture decoding method for decoding the encoded data of an interlaced scanned picture including a frame, and the moving picture decoding method includes: a stereo information acquisition step for acquiring the stereo information indicating whether or not the frame forms a stereo picture from the encoded data; a decoding step for decoding a first frame and a second frame corresponding to each other as a stereo picture from the encoded data and generating a first decoded frame and a second decoded frame; and an output step for outputting the first decoded frame and the second decoded frame decoded in the decoding step, wherein in the output step, whether or not the frame forms a stereo picture is judged by referring to the stereo information acquired in the stereo information acquisition step and if it is judged to form a stereo picture, the first decoded frame and the second decoded frame are outputted, being made to correspond to each other as a stereo picture.

Preferably, the moving picture decoding method further comprises a correspondence information decoding step for decoding correspondence relationship information about a correspondence relationship of the frame included in the encoded data as a stereo picture, and in the output step the first decoded frame and the second decoded frame are outputted, being made to correspond each other as a stereo picture, by referring to the correspondence relationship information decoded in the correspondence information decoding step.

The moving picture decoding program is a moving picture decoding program for causing a computer to decode the encoded data of an interlaced scanned picture including a frame, and the moving picture decoding program causes the computer to execute: stereo information acquisition processing for acquiring the stereo information indicating whether or not the frame forms a stereo picture from the encoded data; decoding processing for decoding a first frame and a second frame corresponding to each other as a stereo picture from the encoded data and generating a first decoded frame and a second decoded frame; and output processing for outputting the first decoded frame and the second decoded frame decoded by the decoding processing, wherein the output processing judges whether or not the frame forms a stereo picture by referring to the stereo information acquired by the stereo information acquisition processing and if judging that it forms a stereo picture, outputs the first decoded frame and the second decoded frame, making them correspond to each other as a stereo picture.

The moving picture decoding apparatus comprises input means for inputting the encoded data of an interlaced scanned picture including a frame; stereo information acquisition means for acquiring the stereo information indicating whether or not the frame forms a stereo picture from the encoded data; decoding means for decoding a first frame and a second frame corresponding to each other as a stereo picture from the encoded data and generating a first decoded frame and a second decoded frame; and output means for outputting the first decoded frame and the second decoded frame decoded by the decoding means, wherein the input means judges whether or not the frame forms a stereo picture by referring to the stereo information acquired by the stereo information acquisition means and when judging that it forms a stereo picture, outputs the first decoded frame and the second decoded frame, making them to correspond to each other as a stereo picture.

The moving picture encoding method is a moving picture encoding method for generating encoded data by encoding an interlaced scanned picture including a frame, and the moving picture encoding method includes: a stereo information addition step for encoding the stereo information indicating whether or not the frame included in the interlaced scanned picture forms a stereo picture and adding it to the encoded data; and an output information addition step for encoding the output timing information holding the information about the timing in which the frame is to be outputted as a stereo picture or the output time information including the information about the time at which the frame is to be outputted as a stereo picture and adding it to the encoded data.

Preferably, the moving picture encoding method further includes a correspondence information addition step for encoding correspondence relationship information about the correspondence relationship of the frame as a stereo picture and adding it to the encoded data.

The moving picture encoding program is a moving picture encoding program for generating encoded data by causing a computer to encode an interlaced scanned picture including a frame, and the moving picture encoding program causes the computer to execute: a stereo information addition processing for encoding the stereo information indicating whether or not the frame included in the interlaced scanned picture forms a stereo picture and adding it to the encoded data; and an output information addition processing for encoding the output timing information including the information about the timing in which the frame is to be outputted as a stereo picture or the output time information holding the information about the time at which the frame is to be outputted as a stereo picture and adding it to the encoded data.

The moving picture encoding apparatus is a moving picture encoding apparatus for generating encoded data by encoding an interlaced scanned picture including a frame, and the moving picture encoding apparatus comprises: stereo information addition means for encoding the stereo information indicating whether or not the frame included in the interlaced scanned picture forms a stereo picture and adding it to the encoded data; and output information addition means for encoding the output timing information holding the information about the timing in which the frame is to be outputted as a stereo picture or the output time information including the information about the time at which the frame is to be outputted as a stereo picture and adding it to the encoded data.

DESCRIPTION OF THE PREFERRED EMBODIMENTS

The embodiments of the present invention are explained with reference to drawings.

Using an example based on a data structure according to the H.264 extension system, that is, an example based on a stereo video field message (hereinafter, referred to as stereo information), a picture timing message (hereinafter, referred to as time information), and the encoding method according to the H.264 extension system (frame, field, frame/field adaptive encoding), encoding and decoding processing of output timing information and output time information, and configurations of encoding and decoding apparatuses for realizing them according to the present invention are explained below. The output timing information is information including the timing in which a first field and a second field are outputted. Detailed description will be given later.

First Embodiment

As a first embodiment of encoding and decoding processing, encoding and decoding processing of a stereo video using output timing information are explained below. In the present embodiment, encoding and decoding processing are explained with reference to program processing by a computer as an example.

Figure 1:
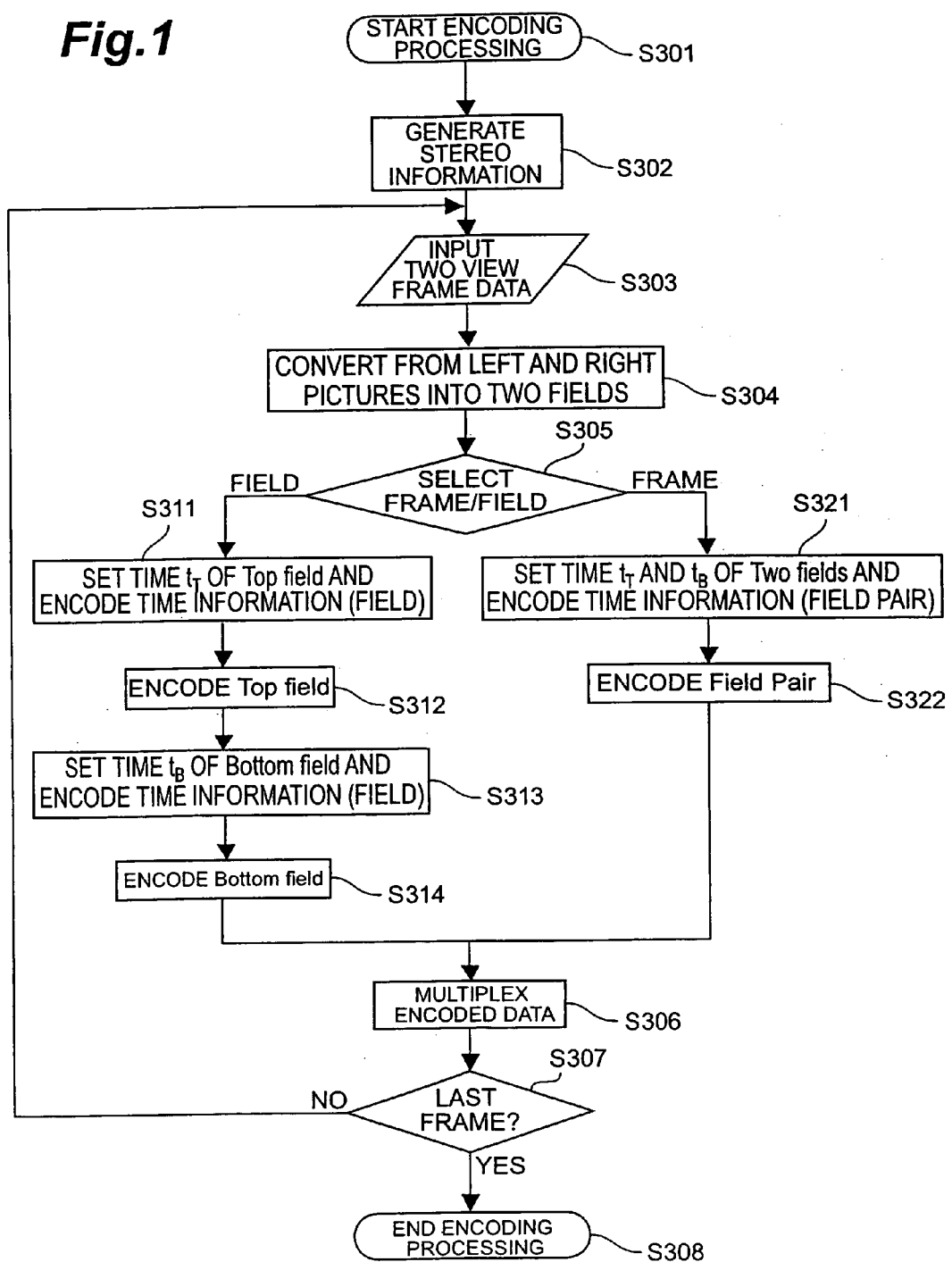
FIG. 1 is flow chart showing encoding processing of a moving picture in a first embodiment.

FIG. 1 shows a flow of encoding processing of a stereo video using output timing information. In the present embodiment, instruction information (output timing information) is prepared for selecting a timing in which the output processing of a two-field pair corresponding to a left-view picture and a right-view picture is executed from each output time of the respective two fields. If the instruction information is encoded with a stereo video, it becomes possible to encode a stereo video without changing other encoding processing just by adding an encoding procedure of stereo information.

Figure 2:
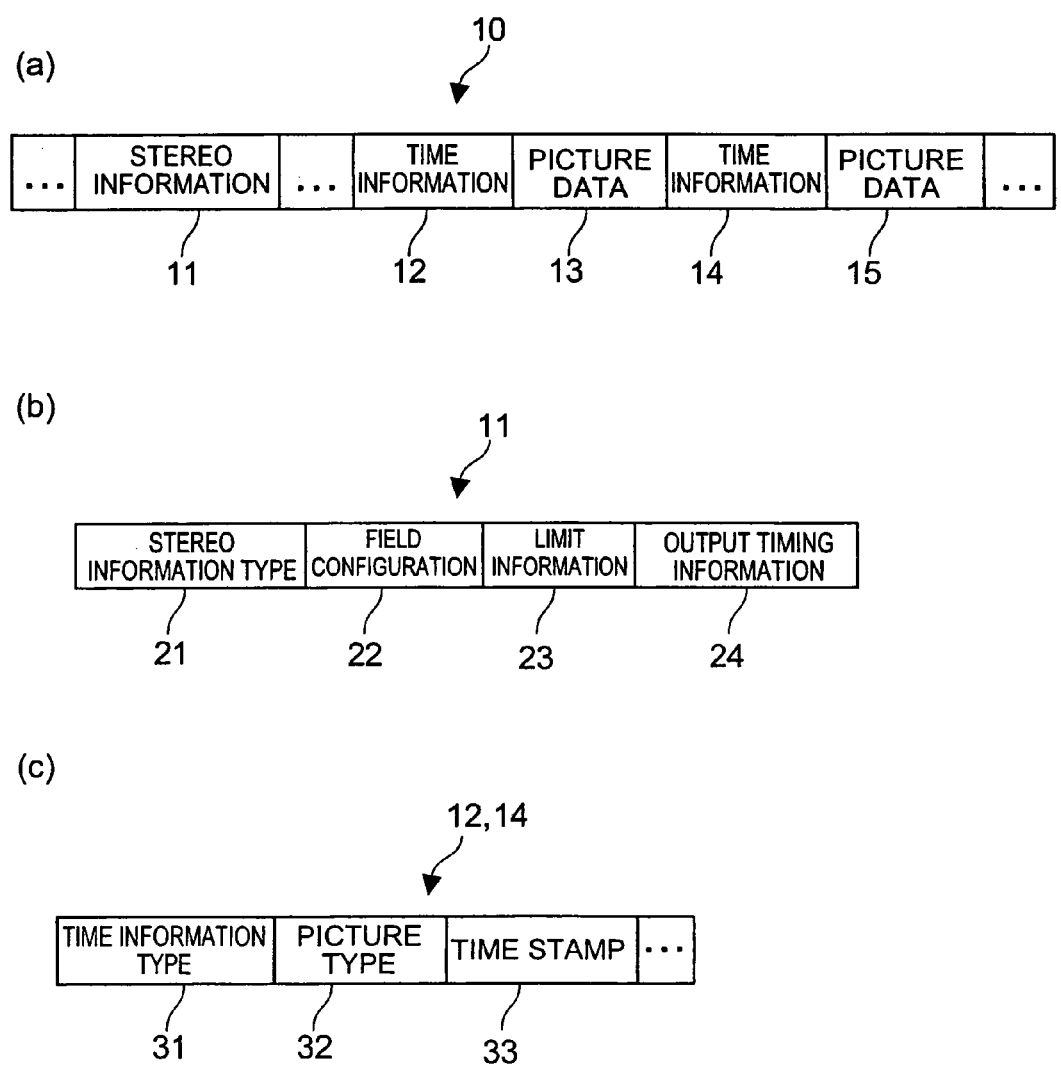
FIG. 2 is a diagram showing a configuration of an encoded moving picture (stereo video).

The processing is started when, for example, the encoding processing start program is called by the moving picture encoding apparatus (S301). The encoding program causes the moving picture encoding apparatus to make preparations for encoding such as reservation of memory (not shown) and at the same time, causes it to generate stereo information 11 (S302, stereo information addition step). As shown in FIG. 2 (a), the stereo information 11 is information included in encoded data 10. FIG. 2 (b) shows the format of the stereo information 11. Stereo information type 21 is signaling information indicating the start of the stereo information, and the presence of the stereo information can be recognized by the detection of this information at decoding processing. Field configuration information 22 is information indicating as which field out of Top field (first field) and Bottom field (second field) corresponding to each other as a stereo picture, a left-view picture and a right-view picture are encoded. Limit information 23 is a flag imposing restrictions on the encoding method of Top field and Bottom field, which inhibits the reference between Top field and Bottom field, and makes it possible to decode a single-view video without information of another view. Output timing information 24 is information for simultaneously executing the output processing of two fields corresponding to each other. It is assumed that, for example, in decoding processing, when the information indicates "Top field", the output processing of two fields corresponding to each other is executed simultaneously at the output time of Top field (or the output processing is executed on the basis of Top POC), and when the information indicates "Bottom field", the output processing of the two fields corresponding to each other is executed at the output time of Bottom field (or the output processing is executed on the basis of Bottom POC). In the present embodiment, it is assumed that in S302, the left-view picture and the right-view picture are assigned respectively to Top field and Bottom field in the field configuration 22 and Top field is specified as the output timing in the output timing information 24 (Top POC is assumed to be the reference value of the output time). Next, the encoding program causes the moving picture encoding apparatus to input one stereo picture (S303) and causes it to convert so that it can be input to the two fields to be encoded (S304).

Further, the encoding program causes the moving picture encoding apparatus to select a filed encoding method (S305). Although in the H.264 system, three types of encoding methods are available, that is, the frame encoding, the field encoding, and the frame/field adaptive encoding, only the frame encoding and the field encoding are considered in the present invention because the same processing is executed by the frame encoding and the frame/field adaptive encoding as to the time information, which is a point of the present invention. The selection of the encoding method is made using a keyboard operated by an operator or GUI of the encoding conditions prepared in advance. The selecting means can be automated. For example, there are methods such as one by which a field is encoded using two types of method and a method with higher encoding efficiency is selected or one by which the statistical correlation between fields is calculated and selection is made by threshold processing.

Next, the encoding program causes the moving picture encoding apparatus to encode each picture under the selected encoding conditions. Here, "picture" is a general term for "frame" and "field". In the field encoding, the encoding program first causes the moving picture encoding apparatus to set the output time $t_T$ of Top field and causes to encode it (S311, output timing information addition step). The thus encoded time information corresponds to each picture data. For example, as shown in FIG. 2 (a), time information 12 corresponds to picture data 13 and time information 14 corresponds to picture data 15, respectively. FIG. 2 (c) shows the format of time information. The front of the format is time information type 31 for signaling the start of the time information, followed by picture type 32 and time stamp 33. The picture type is information indicating the structure of the picture, wherein the structure includes a frame, a field (Top field/Bottom field), a field pair (two fields are processed by the frame encoding or the frame/field adaptive encoding), etc. The time stamp is information indicating the output time, and a piece of the output time information (time stamp) is encoded when the picture type is a frame or a field and two pieces (output time of each field) of the output time information are encoded when the picture type is a field pair. In the present embodiment, the encoding program causes the moving picture encoding apparatus to encode the picture type 32 as a field and causes the computer to encode $t_T$ in the format of time stamp.

Next, the encoding program causes the moving picture encoding apparatus to carry out the encoding processing of Top field (S312). Similarly, the encoding program causes the moving picture encoding apparatus to encode the output time $t_B$ ($t_B=t_T+\frac{1}{60}$ sec) of Bottom field (S313, output timing information addition step) and successively causes it to carry out the encoding processing of Bottom field (S314). At this time, in the H.264 system, it is effective to the decoding processing if the same frame number is assigned to the two fields because the POC value becomes the same. The decoded pictures of the two fields having the same POC value are managed as data in the same frame on the decoding side, so that the simultaneous output is facilitated. As described above, in the case of an encoding system in which two fields are stored in the same frame memory, the simultaneous output processing in the decoding processing becomes easy by generating the encoded data so that the two fields forming the left-view and right-view pictures are stored in the same frame memory. The present embodiment includes an encoding method in which the same picture number is assigned to the two fields so that the two fields forming the left-view and right-view pictures are stored in the same frame memory in the decoding processing.

On the other hand, in the frame encoding, the encoding program first causes the moving picture encoding apparatus to encode the output time $t_T$ and $t_B$ of the two fields (S321). With the picture type 32 being a frame, two output time are encoded with the two time stamps 33. Then, the two-field pair is encoded using the frame coding (S322).

Next, the encoding program causes the moving picture encoding apparatus to form a bit stream by multiplexing each encoded element data (S306, stereo information addition step, output timing information addition step). FIG. 2 (a) shows an example of a bit stream (the encoded data 10). The front of the bit stream is information (not shown) indicating the characteristics of the entire sequence such as a sequence header, followed by information of each picture. Since the stereo information 11 is information about the entire sequence, it is arranged before the first picture of the bit stream. Further, cases such as one where the bit stream is decoded from midway being taken into account, the stereo information 11 is arranged adequately at the front of the random access unit (not shown). Basically, the time information 12 and 14 is arranged before each of the picture data 13 and 15. The stereo information and the time information may be defined as system data for integrating the video data and the audio data. In such a case also, the positional relationship of the decoding order is the same. After this, the encoding program causes the moving picture encoding apparatus to carry out the processing from S303 to S306 repeatedly and causes it to end the encoding processing (S308) at the point of time when the input picture comes to an end (S307).

Figure 3:
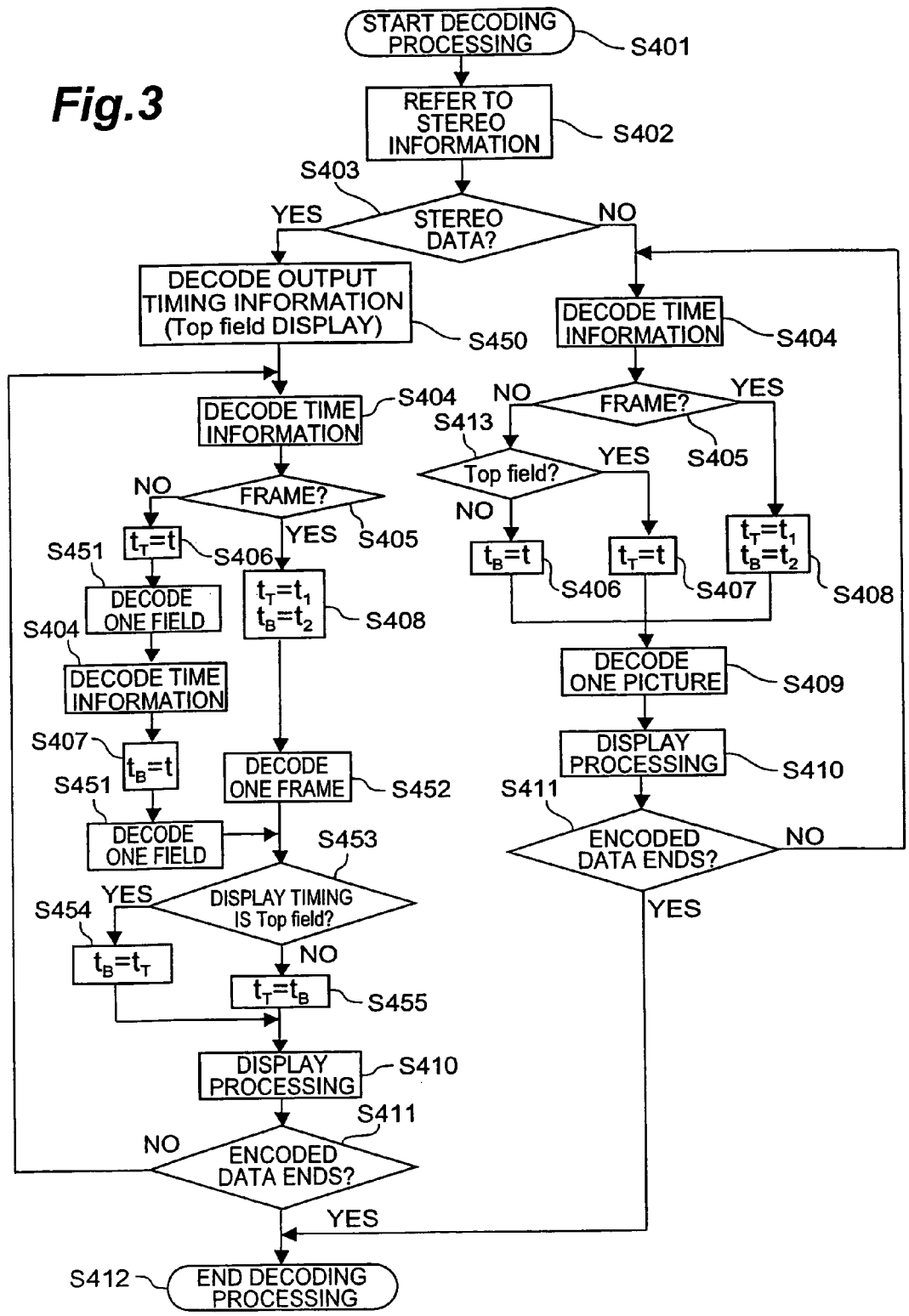
FIG. 3 is a flow chart showing decoding processing of a moving picture in the first embodiment.

Subsequently, the decoding processing of a stereo video is explained. FIG. 3 shows decoding processing flow of a stereo video using the output timing information of the present invention. When the decoding processing start program is called by the moving picture decoding apparatus (S401), the decoding program causes the moving picture decoding apparatus to decode information about the processing of the entire sequence from the front part of the input encoded data and causes it to make preparations for encoding such as reservation of memory (not shown). At this time, the decoding program causes the moving picture decoding apparatus to acquire stereo information, causes it to refer to the stereo information (S402, stereo information acquisition step), and causes it to judge whether or not the decoded picture is stereo data (S403). The judgment in S403 may be such one that a stereo picture is formed when the stereo information is acquired in S402 or a stereo picture is not formed when the stereo information is riot acquired in S402. When the encoded data is stereo data, the element data of the stereo information is decoded and the parity of the field specified by the decoded output timing information 24 (refer to FIG. 2 (b)) is set as the output timing reference (S450, output timing information acquisition step). In the present embodiment, information that the two fields are outputted at the same time as the output time of Top field is included in the output timing information 24 and setting is made so (Top POC is set to the reference value of the output time).

Next, the decoding program causes the moving picture decoding apparatus to decode the time information of the picture to be outputted next (S404) and causes it to judge whether the picture type is a frame or a field (S405). When the picture type is a frame, the decoding program causes the moving picture decoding apparatus to make the time $t_1$ and $t_2$ (the values are in order of decoding) decoded as a time stamp correspond to $t_T$ and $t_B$, respectively (S408), and causes it to acquire the decoded frame by causing it to decode the corresponding frame data (S452). When the picture type is a field, the decoding program causes the moving picture decoding apparatus to make t decoded as a time stamp correspond to $t_T$ (S406), and causes it to acquire the decoded Top field (decoded field) by causing it to decode the picture data (S451, decoding step). Further, the decoding program causes the moving picture decoding apparatus to decode the time information (S404), causes it to make t decoded as a time stamp correspond to $t_B$ (S407), and at the same time, causes it to acquire the decoded Bottom field (decoded field) by causing it to decode the picture data (S451, decoding step).

Next, the decoding program causes the moving picture decoding apparatus to modify the output time in accordance with the information of the parity of the field set to the output timing in S450. Specifically, the decoding program causes the moving picture decoding apparatus to judge whether the output timing setting is Top field or Bottom field (S453) and when the judgment result is Top field, causes the moving picture decoding apparatus to rewrite the value of $t_B$ to $t_T$ (S454) and when the judgment result is Bottom field, causes it to rewrite the value of $t_T$ to $t_B$ (S455). In the present embodiment, since the output timing is set to Top field, then $t_B=t_T$, and the output times of the two fields corresponding to the left-view picture and the right-view picture are the same as a result. After this, the decoding program causes the moving picture decoding apparatus to transmit the decoded frame, the output time ($t_T$, in the present embodiment), and the field configuration 22 to the display processing. And the decoding program causes the moving picture decoding apparatus to output two fields at the same time based on the above-mentioned time (S410, output step). Here, as a concrete example of the display processing, a method may be possible in which the left-view and right-view pictures are to be outputted simultaneously to a display buffer (buffer for storing a picture to be displayed before output to a display apparatus) or a presentation buffer (buffer for a display processing (including such ones that can be realized by software)). In the H.264 system, two fields having the same POC value are recoded in the same frame memory (buffer within the decoding processing section). Therefore, in the encoding processing, it is recommended to assign the same frame number to the two fields corresponding to the left-view and right-view pictures so that the two fields forming the left-view and right-view pictures have the same POC value. Alternatively, as another concrete example, a method may be possible in which the left-view and right-view pictures are outputted to the buffer in different timings and when an actual displaying processing is performed in the display apparatus, the left-view and right-view pictures are displayed simultaneously. After this, the processing from S404 to S410 is repeated until the encoded data comes to an end (S411), and when all of the encoded data are decoded, the decoding processing is ended.

On the other hand, when the encoded data is judged not to be stereo data in S403, the decoding program first causes the moving picture decoding apparatus to decode the time information of the picture to be outputted next (S404), and causes it to judge whether the picture type a frame or a field (S405). Then, when the picture type is a frame, the decoding program causes the moving picture decoding apparatus to make the times $t_1$ and $t_2$ (the values are in order of decoding) decoded as a time stamp correspond to $t_T$ and $t_B$, respectively (S408). When the picture type is a field, the decoding program causes the moving picture decoding apparatus to judge whether the picture type is Top field or Bottom field (S405), and when the judgment result is Top field, causes it to make t decoded as a time stamp correspond to $t_T$ (S406) and when the judgment result is Bottom field, causes it to make t decoded as a time stamp correspond to $t_B$ (S407). After the decoding of the time information and the setting of the output time, the decoding program causes the moving picture decoding apparatus to decode data of a picture and causes it to acquire the decoded frame or the decoded field (S409). Then, the decoding program causes the moving picture decoding apparatus to transmit the decoded picture and the output time to the display processing (S410). After this, the processing from S404 to S410 is repeated until the encoded data comes to an end (S411) and when all of the encoded data are decoded, the decoding processing is ended. Note that, when the encoded data is not stereo data, the processing from S404 to S411 may be omitted, or they may be replaced with other processing.

Although the time information is added to each picture in the explanation described above, it is not necessarily be specified to each picture. For a picture to which no time information is specified, a time stamp is determined based on the refresh rate of an input picture from a relationship between the time reference (POC in the H.264 system) of a picture with time information and the time reference of a picture with no time information. In the case of the stereo coding utilizing the output timing information as in the present embodiment, it is necessary to determine a piece of output time information for the two fields corresponding to each other. In this case, the output timing of the stereo information is utilized as the reference field for executing the conversion of the output time. For example, when the reference field is Top field, the time information $t_T$ is calculated from the relationship between the Top POC of Top field with time information $t_T$ and the Top POC of a field pair with no time information, and the calculated $t_T$ can be used as the output time of the stereo picture. Further, there may be a decoding method in which the display processing is executed using a picture number such as POC and the frame buffer of the decoding processing section. In this case, based on the management rule of the frame buffer regulated for the decoding processing, the picture data stored in the frame memory within the frame buffer is outputted in order of the picture number to the display buffer (or the presentation buffer) and the display processing is executed. At this time, a two-filed pair having the same picture number is stored in the same frame memory, therefore, they are outputted to the display buffer simultaneously.

As described above, according to the present embodiment, it is possible to simultaneously output the left-view and right-view pictures of an encoded stereo video.

Second Embodiment

Encoding and decoding processing of a stereo video using output time information are explained below as encoding and decoding processing in a second embodiment. Similarly to the first embodiment, encoding and decoding processing is explained using program processing by a computer as an example in the present embodiment.

Figure 4:
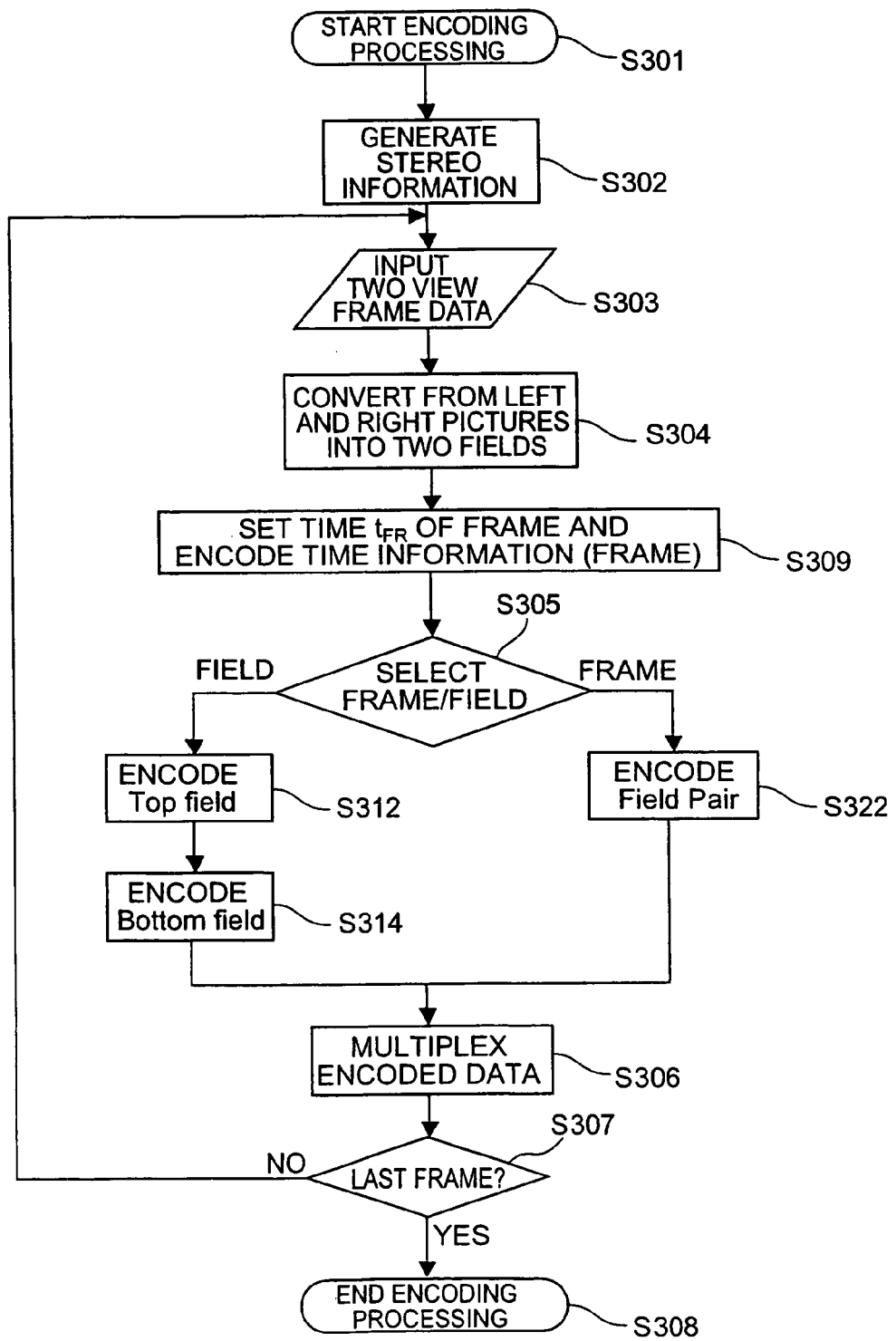
FIG. 4 is a flow chart showing encoding processing of a moving picture in a second embodiment.

FIG. 4 shows encoding processing flow of a stereo video using output time information in the present invention. This method differs from the method using the output timing information in the first embodiment in that one time stamp $t_{FR}$ is encoded as a time at which the output processing of a field pair, that is, a left-view picture and a right-view picture is executed simultaneously regardless of the encoding method being a field encoding or a frame encoding. In the present embodiment, although it is necessary to make modifications to the procedure of the time information in the encoding and decoding methods, there is an advantage that the number of processing is smaller than that in the first embodiment as seen from the comparison with the flow in the first embodiment (comparison between FIG. 1 and FIG. 4, and between FIG. 3 and FIG. 5). Hereinafter, the differences from the first embodiment (FIG. 1) are explained below. In the present embodiment (FIG. 4), instead of S311, S313 and S321 in the first embodiment, S309 is executed before a judgment branch processing (S305). In S309, the encoding program causes the moving picture encoding apparatus to encode the time stamp $t_{FR}$ in units of frame as the time information of a two-view picture. Specifically, it is specified that only when whether or not the decoded picture is stereo data can be recognized by stereo information, one time stamp can be encoded taking the picture type of the time information as a frame. By this processing, it is possible to specify an output time for simultaneously executing the output processing of two fields having different time references (Top POC or Bottom POC in H.264) in the encoding processing.

In the encoding processing shown in FIG. 4, the encoding of output time information (S309) is executed before the branch judgment (S305), however, as a modification example, it may be possible to encode each output time information (S309) before each picture encoding (S312, S314, S322). In this case, since time information always exists before each picture data, the relationship between two fields forming left-view and right-view pictures becomes clearer in the display processing after the decoding processing. Particularly, in a system such as the H.264 system in which the same picture number (POC value) can be assigned to two fields, it is possible to specify such that two fields having the same POC value are stored in the same frame memory after the decoding processing. Because of this, it is possible for the decoding processing section to simultaneously output the left-view and right-view pictures stored in the same frame memory to the display processing section by assigning the same POC value to the two fields forming the left-view and right-view pictures and further assigning the same time information to the two fields. Further, in a system such as the H.264 in which the same picture number (POC value) can be assigned to two fields, since two fields have the same POC value by assigning the same frame number to the two fields forming left-view and right-view pictures, it may be possible to replace the time information with the frame number within the picture data. In the present embodiment, the information, similar to the frame number described above, which can substantially specify the time at which the field is outputted, is also included in the output time information.

Figure 5:
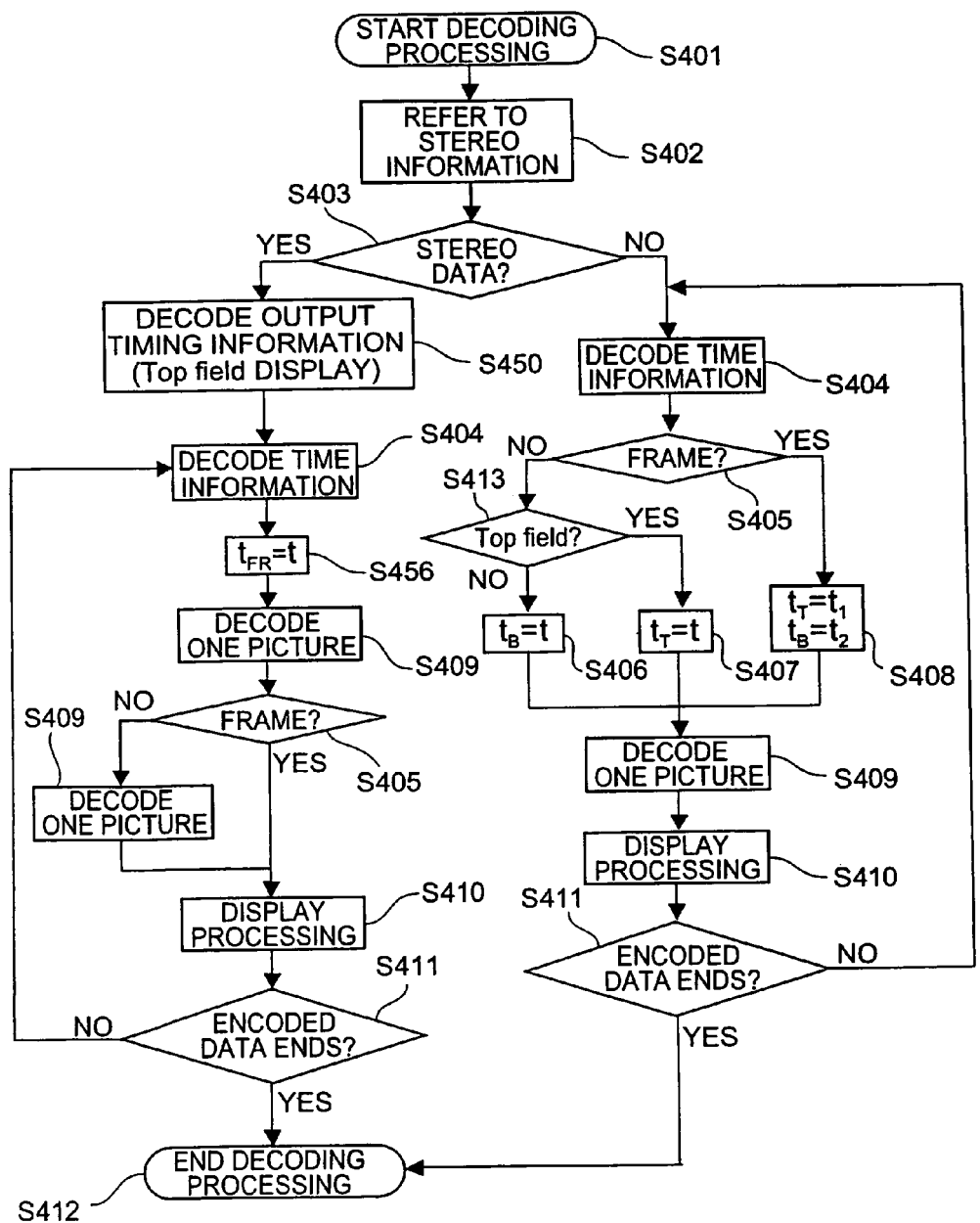
FIG. 5 is a flow chart showing decoding processing of a moving picture in the second embodiment.

FIG. 5 shows decoding processing flow of a stereo video using output time information in the present embodiment. Similarly to the first embodiment (FIG. 3), when the decoding processing start program is called (S401), the decoding program causes the moving picture decoding apparatus to decode information relating to the processing of the entire sequence from the front part of the input encoded data and causes the computer to make preparations for encoding such as reservation of memory (not shown). At this time, the decoding program causes the moving picture decoding apparatus to refer to stereo information (S402) and causes it to judge whether or not the decoded picture is stereo data (S403). The judgment in S403 may be such one that a stereo picture is formed when stereo information is acquired in S402 or a stereo picture is not formed when stereo information is not acquired in S402. When the decoded picture is not stereo data, the processing is the same as that in the first embodiment, therefore, no explanation will be given here. When the decoded picture is stereo information, the stereo information is decoded and the parity of the field specified by the decoded output timing information is set to the output timing reference (S450). As explained in the first embodiment, the output timing is utilized as the reference field for conversion of the output time of the frame (two-field pair) having no time information. Next, the decoding program causes the moving picture decoding apparatus to decode the time information t of the frame to be outputted next (S404) and causes it to decode the picture data (S409) while causing it to make t decoded as a time stamp correspond to $t_{FR}$ (S456). Then, the decoding program causes the moving picture decoding apparatus to judge whether the decoded picture is a frame or a field (S405) and when the judgment result is a field, further causes it to decode also in S409 the field to be output simultaneously with Top field decoded in S409 described above. Then, the decoding program causes the moving picture decoding apparatus to transmit the decoded frame and the output time $t_{FR}$ to the display processing (S410). The subsequent processing are the same as those in the first embodiment. Also in the present embodiment as described above, it is possible to simultaneously output the left-view ant right-view pictures of an encoded stereo video.

Similarly to the first embodiment, as a concrete example of display processing, a case may be possible in which left-view and right-view pictures are to be outputted simultaneously to the display buffer (buffer in which display data is stored before the data is outputted to the display apparatus) or to the presentation buffer (buffer for display processing). In the H.264 system, two fields having the same POC value are stored in the same frame memory (buffer within the decoding processing section). Therefore, it is recommended to assign the same frame number to the two fields corresponding to the left-view and right-view pictures so that the two fields forming the left-view and right-view pictures have the same POC value in the encoding processing. Further, in the decoding processing shown in FIG. 5, the decoding and setting of the output time information (S404, S456) are executed only before the decoding of the first picture (first S409), however, when the same time information is assigned to the two fields described above, the decoding and setting of the output time information (S405, S456) corresponding to the fields are also executed before the second decoding (second S409). Further, when the above-mentioned time information is replaced with the frame number, the processing in S404 and S456 are substituted for by replacing the frame number to be acquired in the processing in S409 with the time information.

[Apparatus Configuration]

Next, the configurations of a moving picture encoding apparatus 200 and a moving picture decoding apparatus 100 for carrying our encoding and decoding processing of a stereo video using output timing information and output time information are explained below. Since the processing are already explained as the encoding processing and the decoding processing, the role of each processing section constituting the apparatuses is described here.

Figure 6:
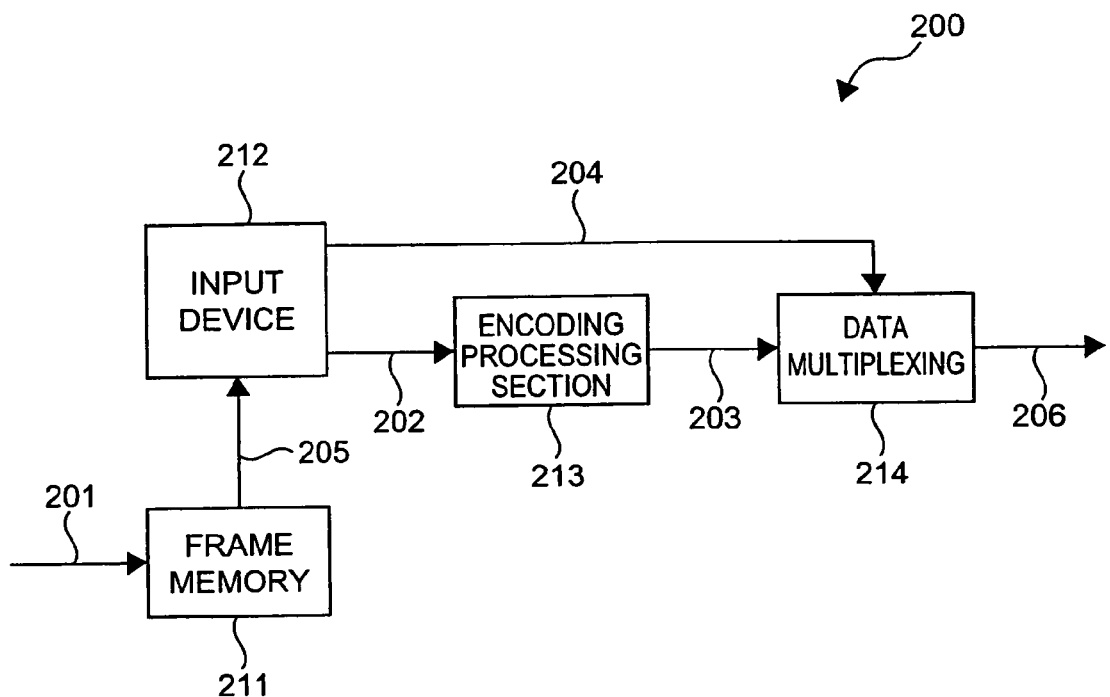
FIG. 6 is a diagram showing a configuration of a moving picture encoding apparatus in an embodiment.

The processing block diagram of the moving picture encoding apparatus 200 is shown in FIG. 6. First, an input stereo picture is stored temporarily in a frame memory 211 through a data path 201. In an input device 212, stereo information and time information such as described in each embodiment are generated and output to a data multiplexing section 214 via a data path 204. Further, the input device 212 receives an input stereo picture through a data path 205 and after converting this into a picture to be encoded having the picture format that an encoding processing section 213 can handle (in this case, converting the left-view and right-view pictures shown in S304 in FIG. 3 etc. into two fields), outputs it to the encoding processing section 213 through a data path 202. The conversion processing of the input device further includes a filtering processing for converting from an input RGB signal into a YUV component signal or converting a picture into a picture restricted noises suitable to encoding. The encoding processing section 213 (stereo information addition means and output time information addition means) encodes an input picture to be encoded and generates video data. The data multiplexing section 214 (stereo information addition means and output time information addition means) multiplexes the video data acquired through a data path 203 and configuration data such as the stereo information or the time information acquired through the data path 204 and generates encoded data. In this manner, by adding processing functions in accordance with the stereo information and the time information to the input device and the data multiplexing section, it is possible to cope with the encoding of a stereo picture without modifying the encoding processing section.

Figure 7:
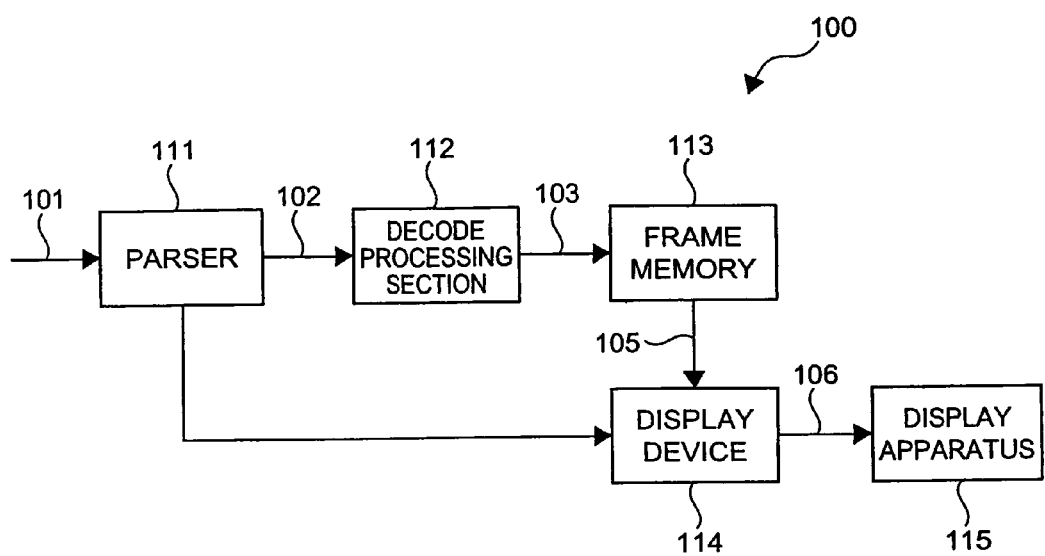
FIG. 7 is a diagram showing a configuration of a moving picture decoding apparatus in an embodiment.

The processing block diagram of the moving picture decoding apparatus is shown in FIG. 7. First, the encoded data input to a parser 111 (input means) through a data path 101 is separated into configuration data and video data. Then, the vide data is delivered to a decoding processing section 112 (stereo information acquisition means, decoding means, output means) through a data path 102 and the stereo information and the time information are delivered to a display device through a data path 104. The decoding processing section 112 reconstructs a picture by decoding the video data and temporarily stores it in a frame memory 113 through a data path 103 (since the decode processing section 112 normally manages a plurality of decoded pictures in the ring buffer, in most cases, the frame memory 113 for the decoded pictures is included within the decoding processing section). A display device 114 stores a decoded picture input through a data path 105 into the internal display buffer using the decoded stereo information and time information, converts it into a display picture corresponding to the format of a display apparatus 115, and displays it on the display apparatus 115 through a data path 106. The conversion processing in the display device includes conversion from a YUV component signal into an RGB signal or a video shaping processing in accordance with the color filter of the display apparatus 115. As described above, it is possible to carry out the decoding processing of a stereo picture without modification of the decoding processing section by modifying only the function in accordance with the stereo information and the time information in the processing of the parser and the display device. More specifically, the display device takes in the decoded pictures of the left-view picture and the right-view picture to the display buffer and composes the two pictures so that they have the format of the display apparatus. At this time, when the two fields forming the above-mentioned left-view and right-view pictures have the same POC value, the two fields forming the decoded pictures of the left-view picture and the right-view picture are to be outputted simultaneously to the display buffer. On the other hand, if they are outputted to the display buffer at different timings, the left-view and right-view pictures are display simultaneously when they are actually outputted on the display apparatus. The output time of the composed picture is set by the processing method explained in each embodiment based on the output timing information and the time information.

[Modifications]

The above-mentioned embodiments may be modified as follows.

In the above-mentioned embodiments, although explanation is made on the basis of the H.264 system, the application of the present invention is not limited to the specific encoding system because the output timing information and the output time information of the present invention can be dealt with separately from the video data. Further, the present invention can be applied to an encoding system not equipped with the frame encoding, the field encoding, or the frame/field adaptive encoding in the H.264 system, or to an encoding system equipped with an encoding method of a field picture as long as it is an encoding system in which two fields are outputted at different time.

The output timing information in the present embodiment is information for instructing in which output timing of the two fields corresponding to the left-view and right-view pictures, the two fields be outputted simultaneously. Therefore, the format is not limited to that of the stereo information 11 in FIG. 2 as long as the format fulfils the purpose. In the above-mentioned embodiments, although the elements of the output timing information are Top field and Bottom field, the elements are not limited to those as long as a selection method is to be specified in another method because the output time can be identified uniquely. For example, a method in which the magnitude of a value (for example, POC) for identifying two fields is taken as the element of the output timing information is also included in the present invention.

Figure 8:
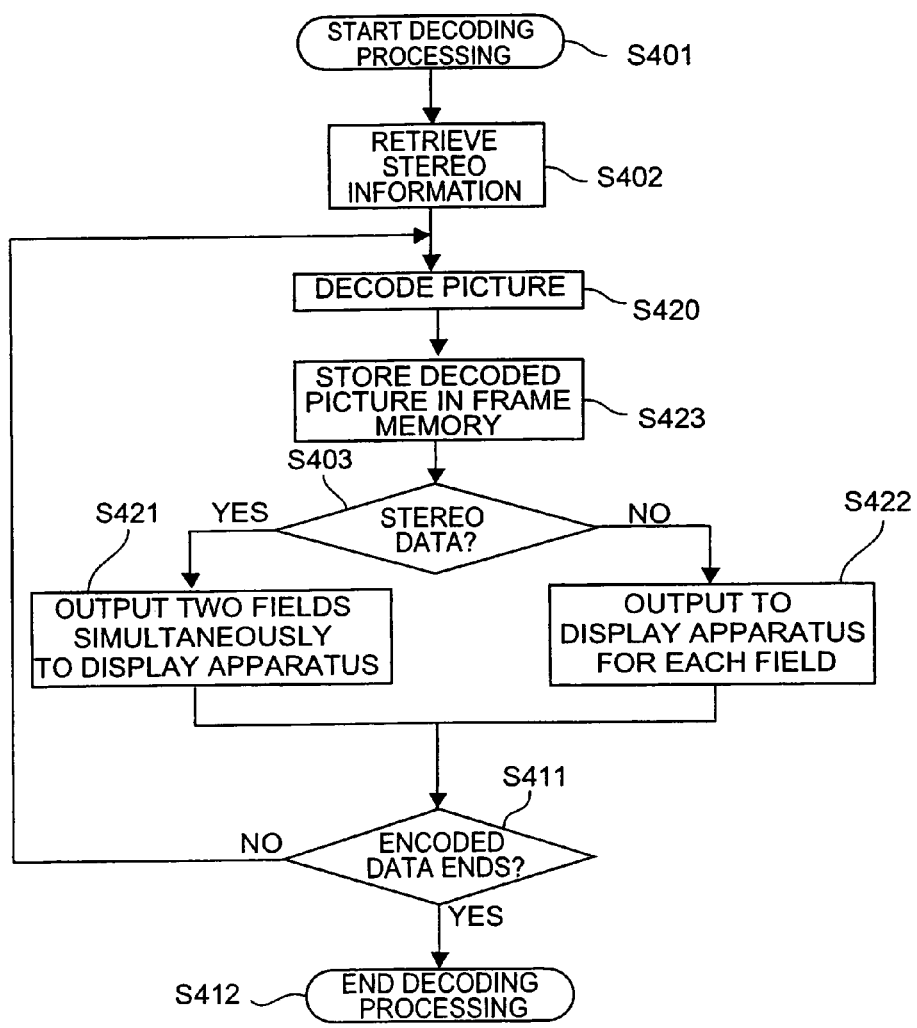
FIG. 8 is a flow chart showing a modification example of decoding processing of a moving picture in an embodiment.

Further, if the number of elements of the output timing is set to one in advance, the output timing information is not necessarily required. However, in this case, it is necessary to specify the information of the output timing determined in advance in the semantics of the stereo information. For example, POC and an output time corresponding to the POC can be utilized as the information of the output timing. Explanation will be given using FIG. 8. The picture decoded in S420 is stored in the frame memory (S423). When the decoded picture stored in the frame memory is outputted to the display apparatus, whether or not the decoded picture is a stereo picture is judged from the stereo information (S403), and when the decoded picture is stereo data, the two fields are to be outputted simultaneously to the display apparatus (S421) and when not, they are outputted to the display apparatus for each field as an interlaced picture (S422). In this case also, the output destination of the stereo picture output from the decoder (frame memory) may be the display buffer within the display device instead of the display apparatus.

In the above-mentioned embodiments, although the information of the output time is encoded separately from the picture data, even when it is encoded in the picture data, the specification processing of the output time based on the output timing information shown in the first and second embodiments can be realized. However, in this case, picture type information 32 in the time information is encoded at the picture header of the picture data, it is omitted normally. Further, the time information explained in the second embodiment can be encoded as the picture data by a simple exchange of order of encoding and this is also included in the present invention.

In the above-mentioned embodiments, the time information is handled within the encoded data of a video, the same handling is enabled for the time information of the system data integrating the encoded data of audio and the encoded data of video. At this time, the picture type for encoding and decoding time information can be omitted because it can be indicated by the presence or absence of the stereo information instead of data that explicitly indicates the picture type. In addition, the stereo information can also be handled in the system data.

In the embodiments described above, the time information has the format of time stamp, however, in the present invention the format is not limited to any specific display format of time, therefore, a case of another display format of time may be also included in the present invention.

In the moving picture encoding apparatus 200 shown in FIG. 6, the frame memory, the input device, and the data multiplexing section are constituted as a processing element different from the encoding processing section. However, if the encoding apparatus, which includes part of them in the encoding processing section, enables the implementation of the encoding processing method of the present invention, the apparatus can be included in the present invention. Similarly, in the moving picture decoding apparatus 100 shown in FIG. 7, the parser, the frame memory, and the display device are constituted as processing elements different from the decoding processing section, if the decoding apparatus, which includes part of them in the decoding processing section, is capable of realizing the decoding processing method of the present invention, the apparatus can be included in the present invention.

Although in the explanation of the second embodiment, the picture type of the time information when stereo information exists is a frame, the picture type is not limited to this if it is possible to specify that the number of time stamps is one for two fields. For example, such a case where "stereo" that specifies that the number of time stamps to be encoded is one is added to a candidate of the picture type is also included in the present invention.

In the embodiments described above, the examples in which the encoding and decoding processing of Top field are executed before those of Bottom field, however, the characteristics of the present invention are not affected by the order of encoding or decoding processing of Top field and Bottom field, therefore, a case where the encoding and decoding processing of Bottom field are executed first is also included in the present invention. Further, the present invention can also be applied to a case where the left-view picture and the right-view picture of a stereo picture are assigned to Top field and Bottom field, respectively, or to Bottom field and Top field, respectively. Therefore, this assignment will not limit the scope of the right of the present invention.

In the embodiments described above, explanations are given on the assumption of an interlaced encoding, however, the present invention can be applied to a case where the progressive encoding of left-view and right-view pictures is executed at different times. For example, when the progressive encoding of left-view and right-view pictures is executed alternately, the output times of the left-view and right-view pictures are different. In this case, a method in which either an odd frame or an even frame is set as the output time for the output timing information or a method in which a type for simultaneously outputting two frames is provided to the picture type of time information may be regarded as an applied method of the present invention.

In the embodiments described above, examples of the interlaced encoding of a stereo picture formed by left-view and right-view pictures are given, however, the present invention can be applied to a case of an N-view picture. Similarly, the present invention can be applied to a case where progressive encoding is executed, an N-view picture being taken as different frames. Here, an N-view picture means such a stereo picture that can be seen stereoscopically by upper and lower-views, in addition to left and right-views (in this case, a four-view picture formed by four pictures, that is, an upper-view picture, a lower-view picture, a left-view picture, and a right-view picture) or a stereo picture that can be seen differently depending of viewing angles.

In this case, decoded frames forming an N-view picture are outputted successively from a decoder to a display buffer (or presentation buffer). Therefore, it is necessary for a decoding processing section and a frame memory to identify the combination of the successive N-view pictures. A concrete example of the method is such one, in which the picture number (POC in the H.264 system) is divided by N and the fractional part is rounded down, and a combination of frames having the same quotient is dealt with as an N-view picture. Alternatively, in the above-mentioned operations, it may be possible to divide a value, which is the picture number minus an offset value (for example, the picture number of an arbitrary frame), by N. Further, a method for judging a combination of frames forming an N-view picture may be such one, in which the above-mentioned value is taken as an input and another operation is applied to it, or such one in which a value such as a reference value determined by an encoding system is used. The identification of a combination is started with a frame that can be randomly accessed. In the H.264, there are two types of data unit that can be randomly accessed. A first one is a picture having a specific picture type not having a prediction reference relationship and the count of POC is reset to zero by this picture. A second one is a picture that has reset the management of a frame memory. Since the prediction relationship between pictures is initialized, it can be identified as a picture that can be randomly accessed. Note that, if specified by the encoding system, it is possible to carry out the identification of combination from an arbitrary frame. Further, the value of N can be defined by the presence of stereo information if, for example, determined in advance as "2" of left-view and right-view pictures, but in an encoding system in which the value of N is not fixed, a method may be possible, in which the value is encoded explicitly by the stereo information 11 in FIG. 2 as combination identification information (example of correspondence relationship information). The combination identification information may also be transmitted by another communication means or handled as system data, similarly to other element data and time information of the stereo information 11. Further, a judgment as to which frame (or a certain frame) corresponds to which picture forming an N-view picture in the decoding processing can be realized by replacing the above-mentioned field configuration with the frame configuration and it is recommended to, for example, include the information in the part corresponding to the field configuration 22 of the stereo information 11 shown in FIG. 2 (b). As described above, by encoding the same time information before the picture data of the N frame, it is possible for the decoder and the system to recognize the decoded picture of the N frame that should be output successively to the display buffer or the presentation buffer and displayed at the same time as a picture forming the N-view picture.

In the embodiments described above, the stereo information, the time information, the combination identification information, etc., are handles as encoded data. But the encoding and decoding processing are not changed even if they are transmitted by another communication mean. Therefore, they are included in the present invention.

Figure 9:
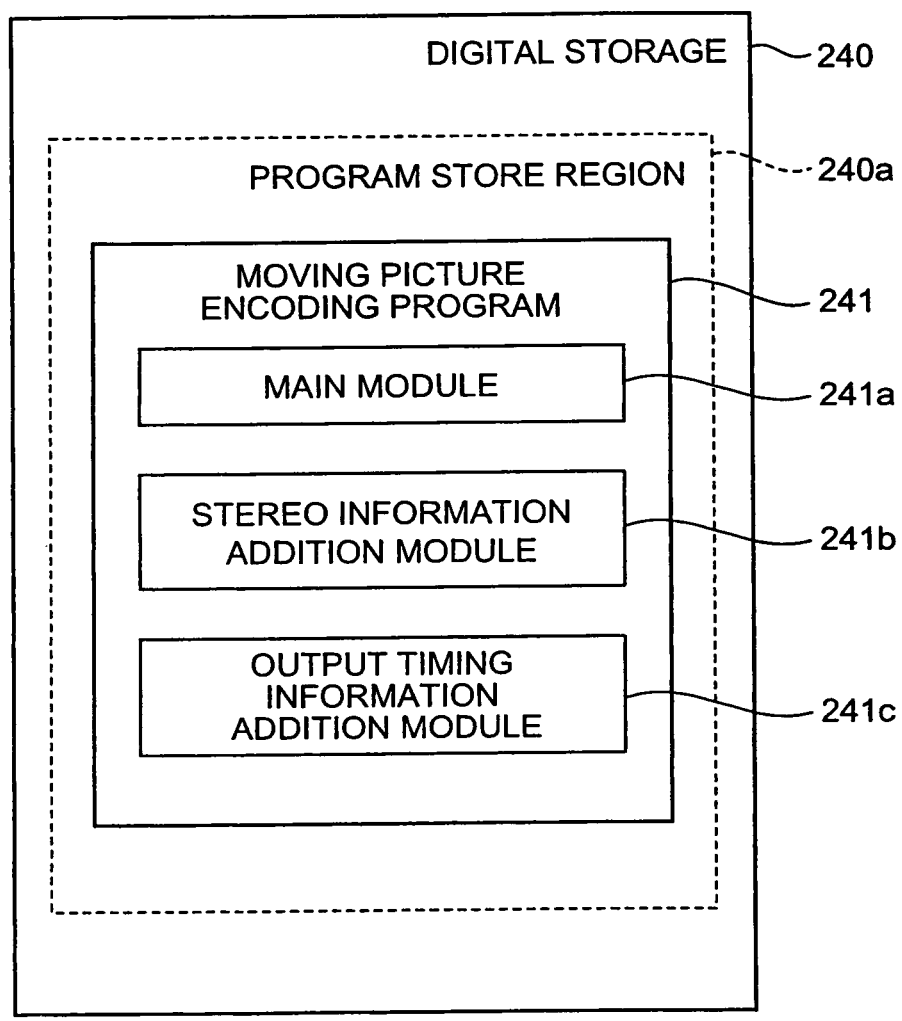
FIG. 9 is a diagram showing a configuration of a moving picture encoding program according to the present invention.
Figure 10:
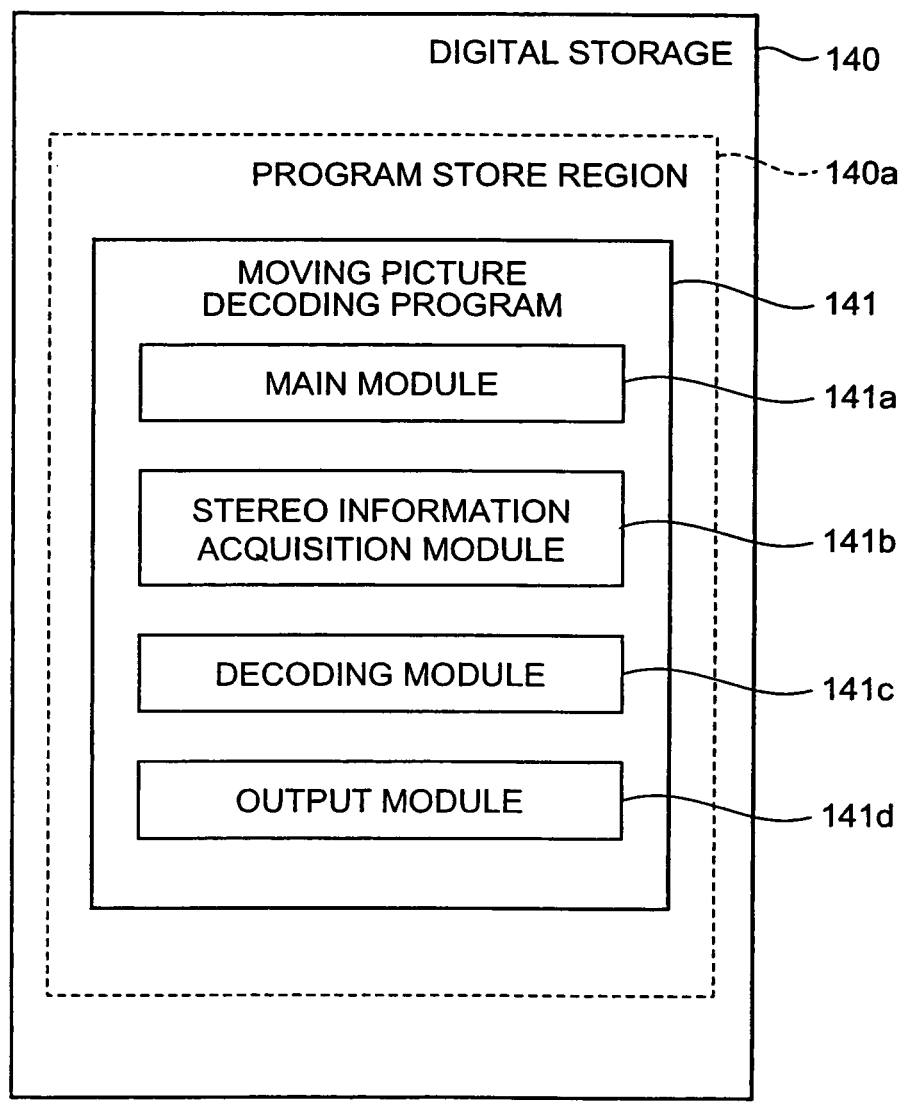
FIG. 10 is a diagram showing a configuration of a moving picture decoding program according to the present invention.

The moving picture encoding program and the moving picture decoding program for executing the above-mentioned series of processing have the following configuration. As shown in FIG. 9, a moving picture encoding program 241 is stored in a program store region 240a formed in a digital storage 240 within the moving picture encoding apparatus 200. As shown in FIG. 10, a moving picture decoding program 141 is stored in a program store region 140a formed in a digital storage 140 within the moving picture decoding apparatus 100.

The moving picture encoding program 241 comprises a main module 241a for generally controlling moving picture encoding processing, a stereo information addition module 241b for encoding stereo information and adding it to encoded data, and an output timing information addition module 241c for encoding output timing information and adding it to encoded data. When processing for adding output time information to encoded data is executed, the moving picture encoding program 241 further comprises an output time information addition module 241d (not shown). The above-mentioned processing is performed by executing these modules. The moving picture decoding program 141 comprises a main module 141a for generally controlling moving picture decoding processing, a stereo information acquisition module 141b for acquiring stereo information, a decoding module 141c for decoding each field, and an output module 141d for outputting the decoded fields. The above-mentioned processing is performed by executing these modules. When processing for acquiring output timing information is executed, the moving picture decoding program 141 further comprises an output timing information acquisition module 141e (not shown) and furthermore comprises an output time information acquisition module 141f (not shown) when processing in which output time information acquires encoded data is executed.

The moving picture encoding and the moving picture decoding program can be provided, for example, by recording media such as CD-ROM, DVD, ROM, etc., or by semiconductor memories. The moving picture encoding and the moving picture decoding program can be a program provided as computer data signals over a carrier wave through a network.

According to the present invention, since each picture (frame or field) can be output simultaneously based on the acquired stereo information, it is possible to simultaneously output the left-view and right-view pictures of an encoded stereo video.

What is claimed is:

1. A moving picture encoding method comprising computer executable steps performed by a processor of a video encoder to implement:

generating a stereo-view pair of first and second pictures;

setting a output timing for display to each of the first and second pictures, wherein the output timing for display of the first picture is different from the output timing for display of the second picture;

encoding the first picture, together with its output timing, and the second picture, together with its output timing, to generate coded picture data; and adding, to the coded picture data, stereo information indicating that the coded picture data includes stereo-view pictures, wherein the stereo information comprises output timing information identifying one of the first and second pictures so that the first picture and the second picture, after decoded, are to be both outputted at the output timing for display of a picture identified by the output timing information, without regard to the output timing for display of the picture not identified by the output timing information, so as to output the first and second pictures simultaneously for stereo-view.

2. A moving picture decoding method for decoding coded video sequence, the method comprising computer executable steps performed by a processor of a video decoder to implement:

receiving the coded video sequence comprising coded picture data, wherein the coded picture data comprises a stereo-view pair of first and second pictures and an output timing for display set to each of the first and second pictures, and the output timing for display of the first picture is different from the output timing for display of the second picture, and further wherein the coded video sequence comprises stereo information to the coded picture data, and the stereo information indicates that the coded picture data comprises stereo-view pictures and comprises output timing information identifying one of the first and second pictures;

decoding the coded picture data to reproduce the first picture and its output timing for display and the second picture and its output timing for display; and outputting the first picture and the second picture at the output timing for display of a picture identified by the output timing information, without regard to the output timing for display of the picture not identified by the output timing information, so as to output the first and second pictures simultaneously for stereo-view.

3. The moving picture decoding method according to claim 2, wherein the first picture and the second picture are outputted for display at their own output timings if the received coded video sequence does not comprise the stereo information.

4. A moving picture encoding apparatus comprising a processor and a memory that stores programs executable by the processor to:

generate a stereo-view pair of first and second;

setting an output timing for display to each of the first and second pictures, wherein the output timing for display of the first picture is different from the output timing for display of the second picture;

encode the first picture, together with its output timing, and the second picture, together with its output timing, to generate coded picture data; and add, to the coded picture data, stereo information indicating that the coded picture data includes stereo-view picture, wherein the stereo information comprises output timing information identifying one of the first and second pictures so that the first picture and the second picture, after decoded, are to be both outputted at the output timing for display of a picture identified by the output timing information, without regard to the output timing for display of the picture not identified by the output timing information, to output the first and second picture simultaneously for stereo-view.

5. A moving picture decoding apparatus for decoding coded video sequence, the apparatus comprising a processor and a memory that stores programs executable by the processor to:

receive the coded video sequence comprising coded picture data, wherein the coded picture data comprises a stereo-view pair of first and second pictures and an output timing for display set to each of the first and second pictures, and the output timing for display of the first picture is different from the output timing for display of the second picture, and further wherein the coded video sequence comprises stereo information added to the coded picture data, and the stereo information comprises output timing information identifying one of the first and second pictures;

decode the encoded picture data to reproduce the first picture and its output timing for display, and the second picture and its output timing for display; and output the first picture and the second picture at the output timing for display of a picture identified by the output timing information, without regard to the output timing for display of the picture not identified by the output timing information, so as to output the first and second pictures simultaneously for stereo-view.

6. The moving picture decoding apparatus according to claim 5, wherein the processor outputs the first picture and the second picture at their own output timings if the coded video sequence does not comprise the stereo information.

7. A non-transitory storage medium coded with a moving picture encoding program causing a processor of a video encoder to:

generate a stereo-view pair of first and second pictures;

setting an output timing for display to each of the first and second pictures, wherein the output timing for display of the first picture is different from the output timing for display of the second picture;

encode the first picture, together with its output timing, and the second picture, together with its output timing, to generate coded picture data; and add, to the coded picture data, stereo information indicating that the coded picture data includes stereo-view pictures, wherein the stereo information comprises output timing information identifying one of the first and second pictures so that the first picture and the second picture, after decoded, are to be both outputted at the output timing for display of a picture identified by the output timing information, without regard to the output timing for display of the picture not identified by the output timing information, so as to output the first and second pictures simultaneously for stereo-view.

8. A non-transitory storage medium coded with a moving picture decoding program causing a processor of a video decoder to decode coded video sequence, the moving picture decoding program further causing the processor to:

receive the coded video sequence comprising coded picture data, wherein the coded picture data comprises a stereo-view pair of first and second pictures and an output timing for display set to each of the first and second pictures, and the output timing for display of the first picture is different from the output timing for display of the second picture, and further wherein the coded video sequence comprises stereo information added to the coded picture data, and the stereo information indicates that the coded picture data comprises stereo-view pictures and comprises output timing information identifying one of the first and second fields;

decode the coded picture data to reproduce the first picture and its output timing for display, and the second picture and its output timing for display; and output the first picture and the second picture at the output timing for display of a picture identified by the output timing information, without regard to the output timing for display of the picture not identified by the output timing information, so as to output the first and second pictures simultaneously for stereo-view.

9. The storage medium according to claim 8, wherein the first picture and the second picture are outputted at their own output timings if the received coded video sequence does not comprise the stereo information.

* * * * *